United States Patent
Song et al.

(10) Patent No.: US 9,796,309 B2
(45) Date of Patent: Oct. 24, 2017

(54) LUMBAR SUPPORT ASSEMBLY

(71) Applicants: Hyundai Motor Company, Seoul (KR); Kia Motors Corporation, Seoul (KR); Daechang Seat Co., Ltd., Gyeongju-si (KR)

(72) Inventors: Hun Woong Song, Ulsan (KR); Chan Ki Cho, Gwangju (KR); Jin Oh Kim, Osan-si (KR)

(73) Assignees: Hyundai Motor Company, Seoul (KR); Kia Motors Corporation, Seoul (KR); Daechang Seat Co., Ltd., Gyeongju-si (KR)

( * ) Notice: Subject to any disclaimer, the term of this patent is extended or adjusted under 35 U.S.C. 154(b) by 61 days.

(21) Appl. No.: 14/935,384

(22) Filed: Nov. 7, 2015

(65) Prior Publication Data

US 2016/0355115 A1 Dec. 8, 2016

(30) Foreign Application Priority Data

Jun. 2, 2015 (KR) ........................ 10-2015-0077944

(51) Int. Cl.
*B60N 2/66* (2006.01)
*B60N 2/22* (2006.01)
*B60N 2/44* (2006.01)

(52) U.S. Cl.
CPC ......... *B60N 2/6673* (2015.04); *B60N 2/2222* (2013.01); *B60N 2/443* (2013.01); *B60N 2/4435* (2013.01); *B60N 2/66* (2013.01); *B60N 2/666* (2015.04)

(58) Field of Classification Search
CPC ......... B60N 2/66; B60N 2/666; B60N 2/6673
USPC ............................................ 297/284.4, 284.7
See application file for complete search history.

(56) References Cited

U.S. PATENT DOCUMENTS

| 3,095,188 | A | * | 6/1963 | Giese | ................... | B60N 2/7058 |
| | | | | | | 267/89 |
| 3,762,769 | A | * | 10/1973 | Poschl | ................... | A47C 7/462 |
| | | | | | | 297/284.4 |
| 4,354,709 | A | * | 10/1982 | Schuster | .............. | A43D 3/1433 |
| | | | | | | 297/284.4 |

(Continued)

FOREIGN PATENT DOCUMENTS

EP 2 322 058 A1 5/2011
EP 2 626 239 A1 8/2013

(Continued)

*Primary Examiner* — David R Dunn
*Assistant Examiner* — Tania Abraham
(74) *Attorney, Agent, or Firm* — Morgan, Lewis & Bockius LLP (57) ABSTRACT

A lumbar support assembly disposed on a seat back frame within a vehicle seat and configured to support the back and waist regions of a passenger may include a fixing wire configured to be disposed on the seat back frame, a comfort mat provided with an upper end disposed on a cross wire combined with an upper end of the fixing wire so as to be rotatable and configured to support the back and waist regions of the passenger, a rotating device disposed on the fixing wire and rotating a lower end of the comfort mat toward the back region of the passenger, and an operating device disposed on the fixing wire and transforming the rotating device to protrude toward the comfort mat.

6 Claims, 7 Drawing Sheets

(56) References Cited

U.S. PATENT DOCUMENTS

| | | | | |
|---|---|---|---|---|
| 4,722,569 | A * | 2/1988 | Morgenstern | A47C 7/462 297/230.14 |
| 5,462,335 | A * | 10/1995 | Seyler | B60N 2/66 297/284.4 |
| 6,676,214 | B2 * | 1/2004 | McMillen | B60N 2/48 297/284.1 |
| 8,091,966 | B2 * | 1/2012 | Schweizer | B60N 2/0232 297/284.7 |
| 8,091,967 | B2 * | 1/2012 | Schweizer | B60N 2/0232 297/284.7 |
| 8,201,886 | B2 * | 6/2012 | Maierhofer | A47C 7/465 297/284.1 |
| 9,415,714 | B2 * | 8/2016 | Kim | B60N 2/6673 |
| 2004/0075319 | A1 * | 4/2004 | VanSickle | A47C 7/465 297/284.4 |
| 2004/0108760 | A1 * | 6/2004 | McMillen | B60N 2/6671 297/284.4 |
| 2007/0102977 | A1 * | 5/2007 | Fischer | B60N 2/0232 297/284.4 |
| 2007/0228789 | A1 * | 10/2007 | McMillen | B60N 2/449 297/284.4 |
| 2007/0236063 | A1 * | 10/2007 | Blendea | A47C 7/465 297/284.4 |
| 2009/0091169 | A1 * | 4/2009 | Neumann | B60N 2/66 297/284.4 |
| 2011/0068611 | A1 * | 3/2011 | Maeda | B60N 2/448 297/284.4 |
| 2014/0070583 | A1 * | 3/2014 | McMillen | B60N 2/66 297/284.4 |
| 2014/0070584 | A1 * | 3/2014 | McMillen | B60N 2/0232 297/284.4 |
| 2014/0125102 | A1 * | 5/2014 | McMillen | B60N 2/66 297/284.4 |
| 2014/0125103 | A1 * | 5/2014 | Suzuki | B60N 2/66 297/284.7 |
| 2014/0346827 | A1 * | 11/2014 | Suzuki | A47C 7/462 297/284.7 |
| 2015/0091349 | A1 | 4/2015 | Hong | |
| 2015/0305506 | A1 * | 10/2015 | Suzuki | B60N 2/66 297/284.4 |
| 2016/0250957 | A1 * | 9/2016 | Yoo | B60N 2/6673 297/284.7 |

FOREIGN PATENT DOCUMENTS

| | | |
|---|---|---|
| JP | 7-34757 A | 2/1995 |
| JP | 2008-104834 A | 5/2008 |
| JP | 2012-218481 A | 11/2012 |
| JP | 2013-504463 A | 2/2013 |
| KR | 1997-0036507 A | 7/1997 |
| KR | 10-0573909 B1 | 4/2006 |
| KR | 10-2012-0090693 A | 8/2012 |
| KR | 10-2012-0098236 A | 9/2012 |
| KR | 10-2012-0119281 A | 10/2012 |
| KR | 10-2013-0012317 A | 2/2013 |
| KR | 10-2013-0049407 A | 5/2013 |
| KR | 10-1444192 B1 | 9/2014 |
| WO | WO 2006/133809 A1 | 12/2006 |
| WO | WO 2012/144672 A1 | 10/2012 |
| WO | WO 2013/015474 A1 | 1/2013 |

* cited by examiner

LUMBAR SUPPORT ASSEMBLY

CROSS-REFERENCE TO RELATED APPLICATION

The present application claims priority to Korean Patent Application No. 10-2015-0077944 filed Jun. 2, 2015, the entire contents of which is incorporated herein for all purposes by this reference.

BACKGROUND OF THE INVENTION

Field of the Invention

The present invention relates to a lumbar support assembly. More particularly, the present invention relates to a lumbar support assembly which is disposed within a vehicle seat back to comfortably support the passenger's back and waist regions.

Description of Related Art

In general, seats are disposed in a vehicle so that passengers may sit on the seats and such a seat includes a seat cushion to support the passenger's hips, a seat back to support the passenger's back, an arm rest on which the passenger's arm may rest, and a head rest to support the passenger's head.

Thereamong, in the case of the seat back, a seat back frame forming the frame of the seat back is disposed within the seat back and a lumbar support assembly to support the passenger's back through a comfort mat is disposed on the seat back frame.

The lumbar support assembly has a variable structure which may be fitted to the passenger's back and spine shape so as to effectively reduce passenger fatigue during driving of the vehicle.

In a conventional variable lumbar support assembly, a protrusion is formed on a rotary rod, which is combined with a seat back frame and rotates, a comfort mat to support the waist of a passenger is disposed on the protrusion, and the rotary rod rotates according to the posture of the passenger sitting on a seat and moves the comfort mat in the forward and backward directions of the seat back frame to support the back and waist of the passenger.

However, in the conventional variable lumbar support assembly, since the position of the rotary rod is fixed, the comfort mat moves only in the forward and backward directions by rotation of the rotary rod and, thus, the passenger sitting on the seat may not adjust transformation of the comfort mat according to his/her own physical conditions.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lumbar support assembly through which a passenger may adjust transformation of a comfort mat depending on the passenger's own physical conditions so as to optimally support the passenger's back and waist regions.

According to various aspects of the present invention, a lumbar support assembly disposed on a seat back frame within a vehicle seat and configured to support the back and waist regions of a passenger may include a fixing wire configured to be disposed on the seat back frame, a comfort mat provided with an upper end disposed on a cross wire combined with an upper end of the fixing wire so as to be rotatable and configured to support the back and waist regions of the passenger, a rotating device disposed on the fixing wire and rotating a lower end of the comfort mat toward the back region of the passenger, and an operating device disposed on the fixing wire and transforming the rotating device to protrude toward the comfort mat.

The lumbar support assembly may further include an elevating device disposed on the fixing wire and moving the rotating device in a length direction of the fixing wire.

The rotating device may include an upper plate combined with the fixing wire so as to be movable in a length direction, a lower plate separated from the upper plate under a condition that the operating device is interposed therebetween and combined with the fixing wire so as to be movable in the length direction, and a support mat provided with a first end hinged to the upper plate and a second end hinged to the lower plate so as to support the lower end of the comfort mat at a rear of the comfort mat.

The operating device may include a first base plate provided with both ends combined with the fixing wire so as to be movable in the length direction, a driving motor disposed at one side of the first base plate and rotating a spindle shaft, the spindle shaft located on the first base plate so as to be rotatable on its axis and combined with the driving motor, a pair of spindle nuts separated from each other on the spindle shaft and rectilinearly moving in opposite directions during rotation of the spindle shaft, a pair of upper link wires combined between the pair of spindle nuts and the upper plate, and a pair of lower link wires combined between the pair of spindle nuts and the lower plate.

Screw threads of opposite directions may be formed at both halves of the spindle shaft of the operating device based on a center thereof and, when the spindle shaft rotates in one direction, the pair of spindle nuts may move in directions of approaching each other.

The elevating device may include a second base plate located above the upper plate and combined with the fixing wire, a driving motor disposed at one side of the second base plate and rotating a spindle shaft, the spindle shaft located on the second base plate so as to be rotatable on its axis and combined with the driving motor, a pair of spindle nuts separated from each other on the spindle shaft and rectilinearly moving in opposite directions during rotation of the spindle shaft, and a pair of second link wires combined between the pair of spindle nuts and the upper plate.

Screw threads of opposite directions may be formed at both halves of the spindle shaft of the elevating device based on a center thereof and, when the spindle shaft rotates in one direction, the pair of spindle nuts may move in directions away from each other.

The support mat may include an upper body provided with a first side hinged to hinge parts formed on the upper plate and a second side having connection parts, a lower body provided with a first side hinged to hinge parts formed on the lower plate and a second side having connection parts, and elastic parts disposed between the connection parts of the upper body and the connection parts of the lower body and configured to be protrusible toward the comfort mat.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

With reference to FIGS. 1 to 7, a lumbar support assembly 100 in accordance with various embodiments of the present invention includes a fixing wire 110, a cross wire 120, an upper plate 130, a lower plate 140, a comfort mat 150, a support mat 160, an operating device 170, and an elevating device 180.

The fixing wire 110 is generally formed in a 'U' shape, the upper end of which is opened, by bending a wire having a designated thickness and the lower end of the fixing wire 110 is combined with a seat back frame by fixing clips.

Here, the seat back frame is disposed within a vehicle seat back and thus maintains the shape of the seat back, is connected to a seat cushion and thus supports the load of a passenger, and has a shape corresponding to the outline shape of the seat back.

The cross wire 120 is combined with the upper end of the fixing wire 110 in the width direction by hanger clips 122 and the upper end of the comfort mat 150 is pivotally combined with the cross wire 120 so as to be rotatable.

The upper and lower plates 130 and 140 are separated from each other by an equal distance on the fixing wire 110 and combined with the fixing wire 110 so as to move upwards and downwards, and hinge parts 132 and 142 to which an upper body 162 and a lower body 164 of the support mat 160 are hinged are provided at designated positions of one side of each of the upper and lower plates 130 and 140.

The comfort mat 150 is configured such that the upper end of the comfort mat 150 is disposed at the cross wire 120 so as to be rotatable, serves to support the waist (spine) and back regions of a vehicle passenger, and is formed of a synthetic resin or a metal.

The comfort mat 150 is symmetrically formed with respect to the center thereof and coupling parts 152 coupled to designated positions of the cross wire 120 in the length direction are formed at both sides of the upper portion of the comfort mat 150.

One end (one of the upper and lower sides) of the support mat 160 is hinged to the hinge parts 132 formed at the upper side of the upper plate 130 and the other end (the other one of the upper and lower sides) of the support mat 160 is hinged to the hinge parts 142 formed at the lower side of the lower plate 140 and, thus, the support mat 160 supports the lower end of the comfort mat 150 at the rear of the comfort mat 150 so that the comfort mat 150 is rotated toward the back region of the passenger.

Such a support mat 160 includes the upper and lower bodies 162 and 164 respectively including a pair of connection parts 162a and a pair of connection parts 164a separated from each other by an equal distance and provided at left and right sides thereof, and a pair of elastic parts 166, each of which has one end combined with the connection part 162a provided on the upper body 162 and the other end combined with the connection part 164a provided on the lower body 164.

That is, one side of each of the upper body 162 and the lower body 164 is hinged to the hinge parts 132 or 142 of the upper or lower plate 130 or 140, and the pair of elastic parts 166 is disposed between the connection parts 162a and 164a of the upper and lower bodies 162 and 164 so as to be protrusible toward the comfort mat 150.

Here, the upper plate 130, the lower plate 140 and the support mat 160 are disposed on the fixing wire 110 and function as a rotating device to rotate the lower end of the comfort mat 150 toward the back region of the passenger.

The operating device 170 transforms the rotating device to protrude the rotating device toward the comfort mat 150 and is mounted on the fixing wire 110 so as to be located between the upper and lower plates 130 and 140. The operating device 170 functions to protrude the center of the support mat 160 toward the comfort mat 150 so that the comfort mat 150 may be rotated (or protrude) toward the back region of the passenger.

Figure 1:
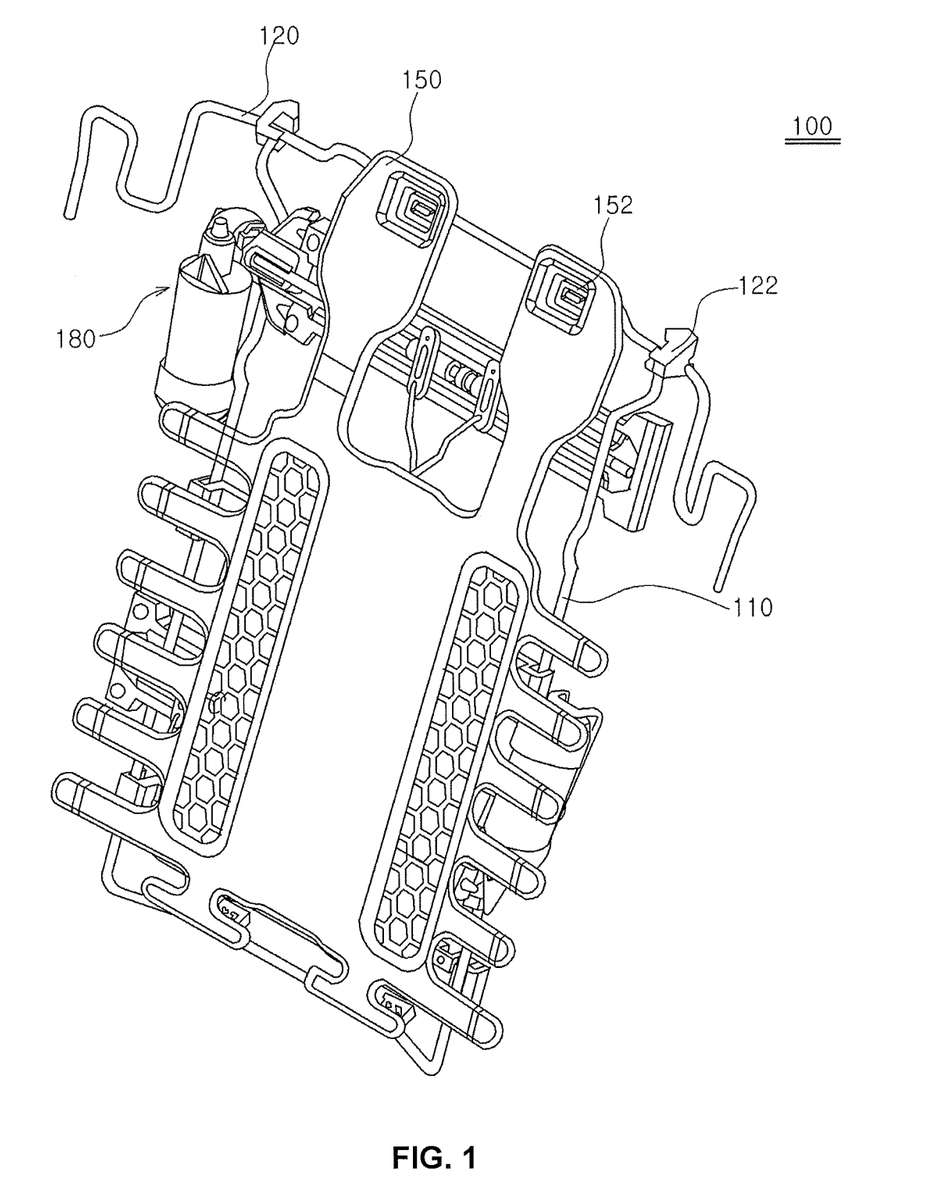
FIG. 1 is a perspective view of an exemplary lumbar support assembly in accordance with the present invention.
Figure 2:
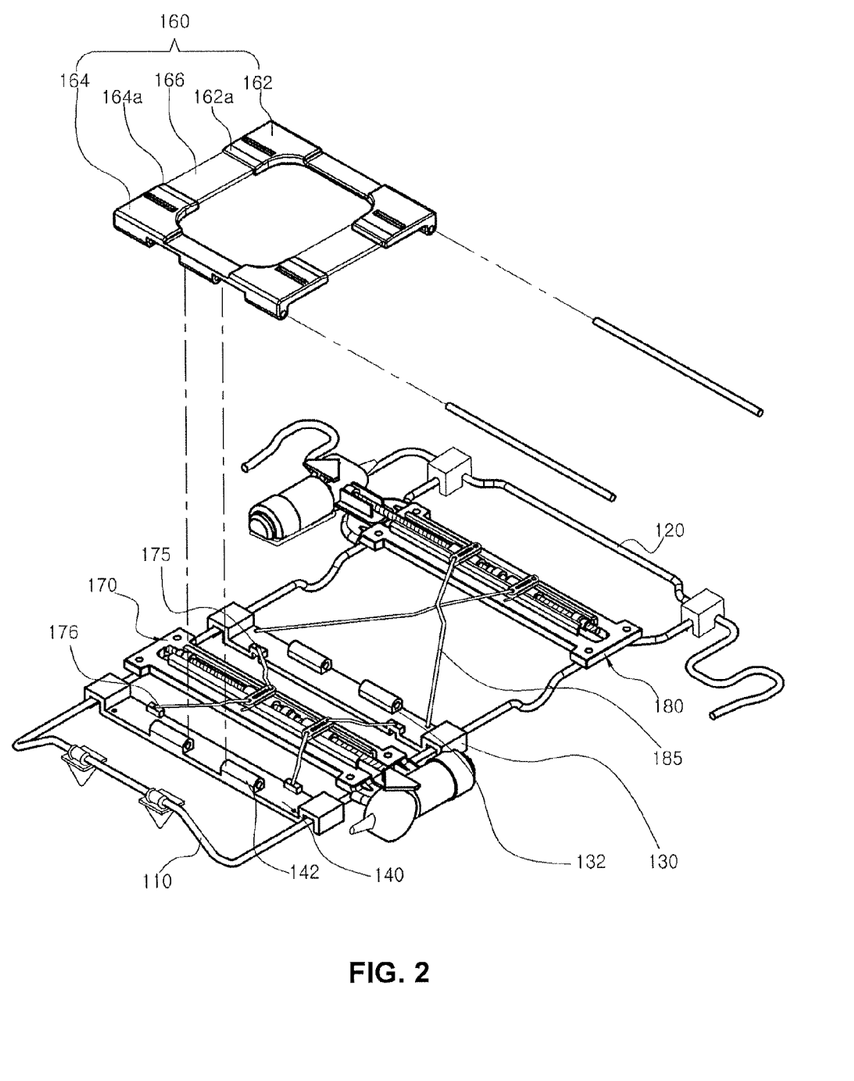
FIG. 2 is an exploded perspective view of FIG. 1.
Figure 3:
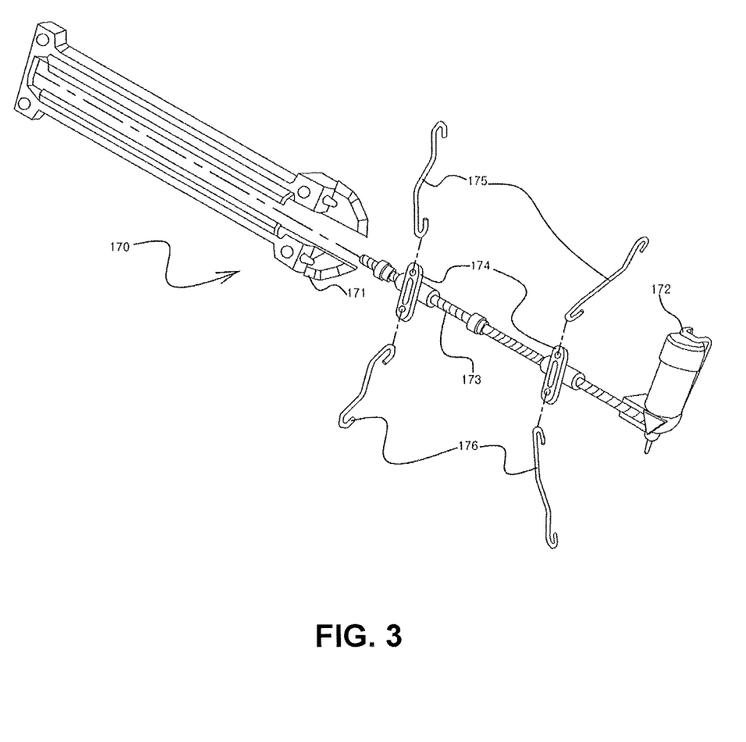
FIG. 3 is an exploded perspective view of an operating device shown in FIG. 2.

Such an operating device 170 includes a first base plate 171 provided with both ends combined with the fixing wire 110 so as to be movable in the length direction, a driving motor 172 disposed at one side of the first base plate 171 and rotating a spindle shaft 173, the spindle shaft 173 located at the upper portion of the first base plate 171 so as to be rotatable on its axis and provided with one end combined with the driving motor 172, a pair of spindle nuts 174 separated from each other on the spindle shaft 173 and combined with the spindle shaft 173 using screws, a pair of upper link wires 175, each of which is provided with one end combined with one side of each of the pair of spindle nuts 174 and the other end combined with a designated position of the upper plate 130 so that the other ends of the pair of upper link wires 175 are separated from each other by an equal distance, and a pair of lower link wires 176, each of which is provided with one end combined with the other side of each of the pair of spindle nuts 174 and the other end combined with a designated position of the lower plate 140 so that the other ends of the pair of lower link wires 176 are separated from each other by an equal distance.

Here, a right-handed screw thread and a left-handed screw thread are symmetrically formed at both halves of the spindle shaft 173 with respect to the center of the spindle shaft 173 so that the pair of spindle nuts 174 may simultaneously slide in opposite directions.

That is, screw threads of opposite directions are formed at both halves of the spindle shaft 173 based on the center thereof and, when the spindle shaft 173 rotates in one direction, the pair of spindle nuts 174 moves in directions of approaching each other. At this time, the pair of spindle nuts 174 is supported by the support structure protruding in the upward direction of the first base plate 171, thus safely moves rectilinearly.

The elevating device 180 serves to move the above-described rotating device in the length direction of the fixing wire 110. The elevating device 180 is mounted at a designated position of the upper portion of the fixing wire 110 and moves the upper plate 130 so as to move the support mat 160 in the length direction of the fixing wire 110.

Figure 4:
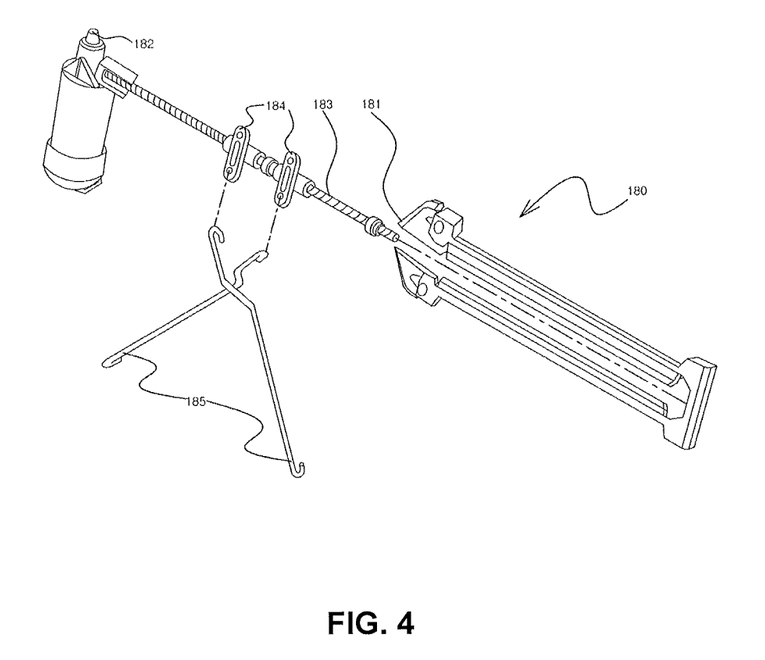
FIG. 4 is an exploded perspective view of an elevating device shown in FIG. 2.

Such an elevating device 180 includes a second base plate 181 located above the upper plate 130 and provided with both ends combined with designated positions of the upper portion of the fixing wire 110, a driving motor 182 disposed at one side of the second base plate 181 and rotating a spindle shaft 183, the spindle shaft 183 being located at the upper portion of the second base plate 181 so as to be rotatable on its axis and provided with one end combined with the driving motor 182, a pair of spindle nuts 184 separated from each other on the spindle shaft 183 and combined with the spindle shaft 183 using screws, and a pair of second link wires 185, each of which is provided with one end combined with one side of each of the pair of spindle nuts 184 and the other end combined with a designated position of one side of the upper plate 130 so that the other ends of the pair of second link wires 185 are separated from each other by an equal distance.

Here, ends of the second link wires 185 in a pair are combined with the spindle nuts 184 and the other ends of the second link wires 185 in a pair are combined with the upper plate 130 such that the second link wires 185 cross each other.

Further, a right-handed screw thread and a left-handed screw thread are symmetrically formed at both halves of the spindle shaft 183 with respect to the center of the spindle shaft 183 so that a pair of spindle nuts 184 may simultaneously slide in opposite directions.

That is, screw threads of opposite directions are formed at both halves of the spindle shaft 183 based on the center thereof and, when the spindle shaft 183 rotates in one direction, the pair of spindle nuts 184 moves in directions of becoming away from each other. At this time, the pair of spindle nuts 184 is supported by the support structure protruding in the upward (or forward) direction of the second base plate 181, thus safely moves rectilinearly.

Hereinafter, an operation of the above-described lumbar support assembly 100 will be described with reference to FIGS. 5 to 7.

First, when a passenger operates the driving motor 172 of the operating device 170, the spindle shaft 173 rotates in a regular direction and the pair of spindle nuts 174 separated from each other by an equal distance on the spindle shaft 173 slides so as to approach each other.

Figure 5:
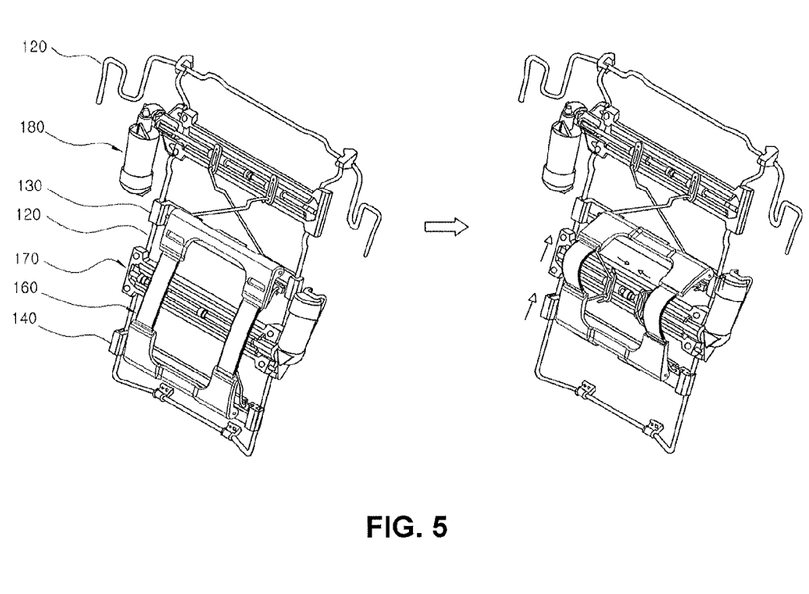
FIG. 5, FIG. 6, and FIG. 7 are views illustrating the operating state of the exemplary lumbar support assembly in accordance with the present invention.

As exemplarily shown in FIG. 5, when the pair of spindle nuts 174 rectilinearly moves so as to approach each other, the first base plate 171 and the lower plate 140 move toward the upper plate 130 by the pair of upper link wires 175 and the pair of lower link wires 176, each of which is provided with one end combined with one side or the other side of each of the pair of spindle nuts 174 and the other end combined with each of the upper and lower plates 130 and 140.

Figure 6:
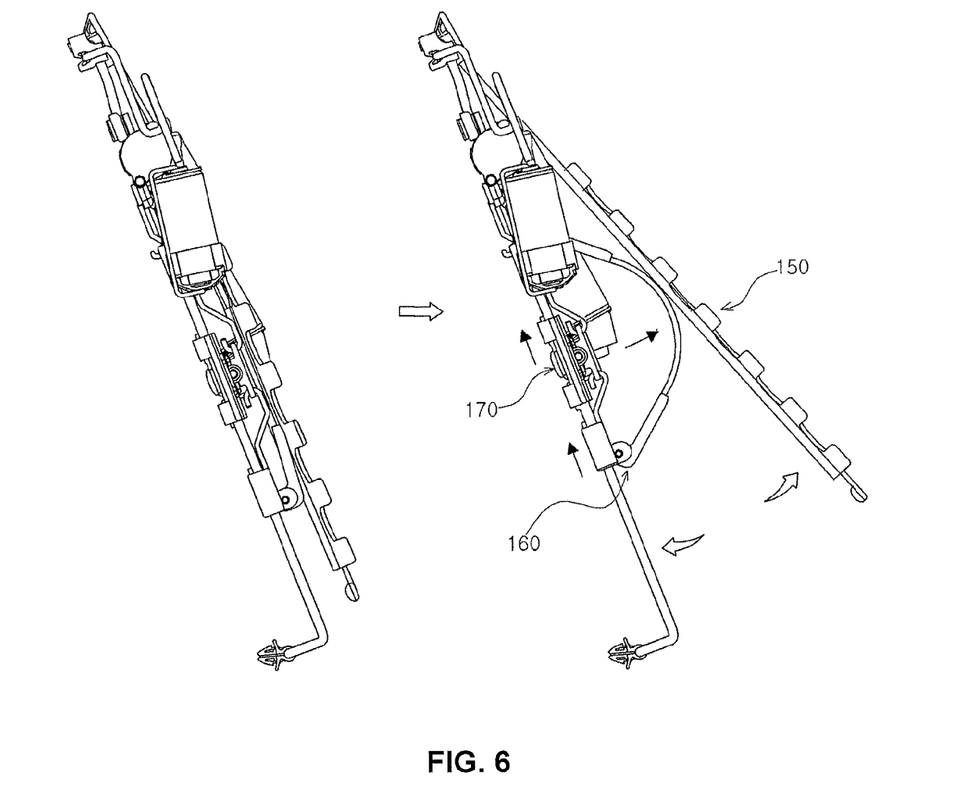

When the first base plate 171 and the lower plate 140 move toward the upper plate 130, the support mat 160 provided with one end combined with the upper plate 130 and the other end combined with the lower plate 140 protrudes toward the back of the passenger and pushes the comfort mat 150 toward the back of the passenger, as exemplarily shown in FIG. 6.

Accordingly, the lower end of the comfort mat 150 rotates toward the back and waist regions of the passenger about the upper end of the comfort mat 150 pivotally combined with the cross wire 120 and, thus, the comfort mat 150 supports the back of the passenger while being closely adhered to the back of the passenger.

Further, when the passenger operates the driving motor 182 of the elevating device 180, the spindle shaft 183 rotates and the pair of spindle nuts 184 separated from each other by an equal distance on the spindle shaft 183 slides in directions of becoming away from each other.

Figure 7:
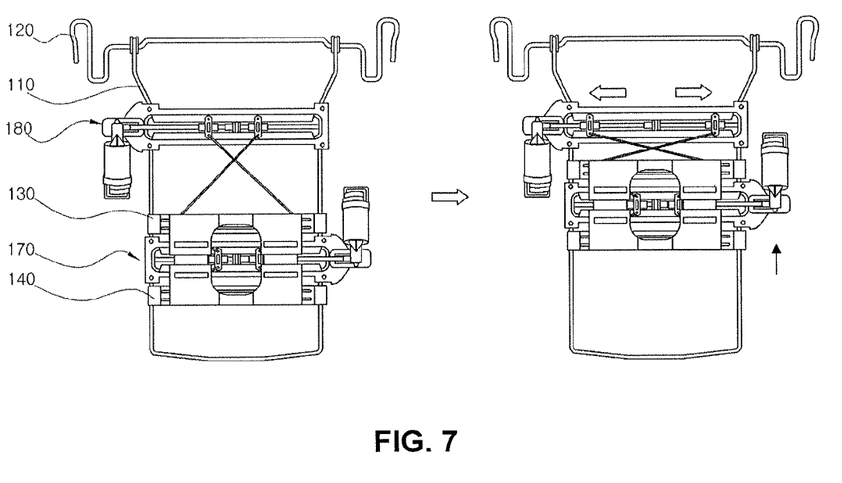

As exemplarily shown in FIG. 7, when the pair of spindle nuts 184 rectilinearly moves so as to become away from each other, the upper plate 130 is pulled toward the second base plate 181 (moved upwards) by the pair of second link wires 185, each of which is provided with one end combined with one side of each of the pair of spindle nuts 184 and the other end combined with the upper plate 130 so that the other ends of the pair of second link wires 185 are separated from each other by an equal distance.

When the upper plate 130 is pulled toward the second base plate 181, the support mat 160, the upper and lower plates 130 and 140 connected to each other by the support mat 160, and the operating device 170 located between the upper and lower plates 130 and 140 and connected to the support mat 160 through the upper and lower link wires 175 and 176 integrally move and, thus, the position of the support mat 160 in the vertical direction may be adjusted.

As described above, the lumbar support assembly in accordance with various embodiments of the present invention allows a passenger to adjust transformation (a vertical height and a forward protruding degree) of the comfort mat according to the passenger's physical conditions and may thus optimally support the back and waist regions of the passenger.

As is apparent from the above description, the present invention provides a lumbar support assembly which allows a passenger to adjust transformation of a comfort mat depending on the passenger's physical conditions and may thus optimally support the back and waist regions of the passenger.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lumbar support assembly disposed on a seat back frame within a vehicle seat and configured to support the back and waist regions of a passenger, the lumbar support assembly comprising:
    a fixing wire configured to be disposed on the seat back frame;
    a comfort mat provided with an upper end disposed on a cross wire combined with an upper end of the fixing wire so as to be rotatable and configured to support the back and waist regions of the passenger;
    a rotating device disposed on the fixing wire and rotating a lower end of the comfort mat toward the back region of the passenger; and
    an operating device disposed on the fixing wire and transforming the rotating device to protrude toward the comfort mat,
    wherein the rotating device includes:
        an upper plate combined with the fixing wire so as to be movable in a length direction;
        a lower plate separated from the upper plate under a condition that the operating device is interposed therebetween and combined with the fixing wire so as to be movable in the length direction; and
        a support mat provided with a first end hinged to the upper plate and a second end hinged to the lower plate so as to support the lower end of the comfort mat at a rear of the comfort mat, and
    wherein the operating device includes:
        a first base plate provided with both ends combined with the fixing wire so as to be movable in the length direction;
        a driving motor disposed at one side of the first base plate and rotating a spindle shaft;
        the spindle shaft located on the first base plate so as to be rotatable on its axis and combined with the driving motor;
        a pair of spindle nuts separated from each other on the spindle shaft and rectilinearly moving in opposite directions during rotation of the spindle shaft;
        a pair of upper link wires combined between the pair of spindle nuts and the upper plate; and
        a pair of lower link wires combined between the pair of spindle nuts and the lower plate.

2. The lumbar support assembly of claim 1, further comprising:
    an elevating device disposed on the fixing wire and moving the rotating device in a length direction of the fixing wire.

3. The lumbar support assembly of claim 2, wherein the elevating device includes:
    a second base plate located above the upper plate and combined with the fixing wire;
    a driving motor disposed at one side of the second base plate and rotating a spindle shaft;
    the spindle shaft located on the second base plate so as to be rotatable on its axis and combined with the driving motor;
    a pair of spindle nuts separated from each other on the spindle shaft and rectilinearly moving in opposite directions during rotation of the spindle shaft; and
    a pair of second link wires combined between the pair of spindle nuts and the upper plate.

4. The lumbar support assembly of claim 3, wherein screw threads of opposite directions are formed at both halves of the spindle shaft of the elevating device based on a center thereof and, when the spindle shaft rotates in one direction, the pair of spindle nuts moves in directions away from each other.

5. The lumbar support assembly of claim 1, wherein screw threads of opposite directions are formed at both halves of the spindle shaft of the operating device based on a center thereof and, when the spindle shaft rotates in one direction, the pair of spindle nuts moves in directions approaching each other.

6. The lumbar support assembly of claim 1, wherein the support mat includes:
    an upper body provided with a first side hinged to hinge parts formed on the upper plate and a second side having connection parts;
    a lower body provided with a first side hinged to hinge parts formed on the lower plate and a second side having connection parts; and
    elastic parts disposed between the connection parts of the upper body and the connection parts of the lower body and configured to be protrusible toward the comfort mat.

* * * * *